Patented Aug. 21, 1934

1,971,111

UNITED STATES PATENT OFFICE 1,971,111

PRODUCTION OF NITROPHOSPHATES

Emil Lüscher and Samuel Ruosch, Basel, Switzerland

No Drawing. Application May 20, 1932, Serial No. 612,636. In Switzerland July 14, 1927

4 Claims. (Cl. 71—7)

This invention relates to the production of nitrophosphates by decomposing raw phosphates with nitric acid and is a continuation in part of our application Serial No. 292,321, filed July 12, 1928.

According to known proposals relatively dilute nitric acid, preferably 50–60% nitric acid, has been employed for the decomposition of raw phosphates. Thus, for example in U. S. A. patent specification No. 1,058,145 (Braun) a 54.78% nitric acid and in U. S. A. patent specification No. 1,293,293 (Foss) a 55–60% nitric acid has been recommended for the purpose. When employing nitric acid of such concentrations decomposition products are obtained which on cooling set to a solid mass containing a normal or even increased amount of water of crystallization, i. e. which contain their main constituents in the form of $Ca(NO_3)_2.4H_2O$ and $CaH_4P_2O_8.H_2O$. Even when employing nitric acid of somewhat higher concentration, for example a 62% acid, nitrophosphates are obtained which have a normal content of water of crystallization, particularly if the raw phosphates contain comparatively large amounts of calcium carbonate or if calcium carbonate has been specifically added thereto, since in the decomposition of calcium carbonate according to the formula

$$CaCO_3 + 2HNO_3 = Ca(NO_3)_2 + H_2O + CO_2$$

more water is formed.

Nitric acid of higher concentration has hitherto not been employed for the production of nitrophosphates, presumably chiefly because it was feared that considerable losses of nitric acid would occur owing to the decomposition of the acid with the formation of oxides of nitrogen and water and also because it was assumed that, when operating with concentrated nitric acid, complete decomposition of the phosphates with the formation of a water-soluble product would be rendered difficult.

In Swiss patent specification No. 87,762 it is expressly recommended to treat the tricalcium phosphate with at least so much water-containing nitric acid that the end product contains at least as much water as is required to enable its components to crystallize out with water of crystallization, i. e. that the main constituents, $Ca(NO_3)_2.4H_2O$ and $CaH_4P_2O_8.H_2O$, can crystallize out, it being also stated that an excess of water amount to, for example, 1–2%, is not detrimental and may even frequently be necessary.

The nitrophosphates obtained according to the known processes and containing a normal amount of water of crystallization are so deliquescent that, even on standing for a short time in the air, they assume a pasty or viscous condition. The aforesaid nitrophosphates have, moreover, so low a softening point that they become sticky even from the warmth of the hand, on which account and owing to their deficient keeping qualities and deficient capability of strewing, they cannot be employed as fertilizers.

The procedure hitherto adopted to overcome these disadvantages has been to add more or less large quantities of foreign substances to the nitrophosphates.

Thus, according to German patent specification No. 339,567, the nitrophosphate obtained by decomposition of raw phosphates with 60% nitric acid and containing readily deliquescent calcium nitrate, is converted more or less extensively into the non-hygroscopic urea-calcium nitrate double salt. According to German patent specification No. 405,832, so much calcium sulphate is added to the product obtained by decomposing raw phosphate with nitric acid that the calcium nitrate is converted into calcium sulphate. According to French patent specification No. 402,-688, so much calcium carbonate or calcium oxide is added to the decomposition product that the water is fixed, whereby, however, the water-soluble phosphate obtained by the decomposition is again, to a large extent, re-converted into difficultly soluble di- and tricalcium phosphates.

According to the present invention a durable and storable nitrophosphate capable of being strewn is directly obtained by effecting the decomposition of the raw phosphates with a nitric acid of such concentration and in such quantity that the end product contains substantially less water than corresponds to the normal content of water of crystallization of the components contained therein.

Particularly valuable products suitable for fertilizing purposes are those which contain only as much water as corresponds mathematically to a calcium nitrate containing about 2–3 molecules of water. Acid-concentrations of about 65% to about 75% are, in general, suitable for the production of such products. In other respects the concentration and quantity of nitric acid employed are to be adapted to the quality and composition of the raw phosphate under treatment, the quantity and concentration of the nitric acid within the hereinbefore mentioned limits being so selected that the water contained therein is not sufficient to convert the calcium nitrate of the nitrophosphate into tetrahydrate, but is only sufficient for the formation of the hereinbefore mentioned products containing only a little water of crystallization (only 2–3 mols of water per 1 mol of $Ca(NO_3)_2$). The quantity and concentration of nitric acid most suitable for the treatment of specific raw phosphate may be mathematically calculated or ascertained by a few prior tests.

The nitric acid may be employed in the quantity theoretically required for the decomposition or in slight excess thereof, always with the precaution, however, that no more water is thereby introduced into the reaction than is necessary for the formation of the desired nitrophosphates containing only a little water. Very high acid concentrations, for example those of 80% and more, are not suitable for the present process, since, apart from other disadvantages, the complete decomposition of the phosphate is rendered difficult thereby both in a chemical and mechanical sense and a considerable part of the nitric acid is decomposed with the formation of nitrogen oxide and water.

By keeping to the aforementioned conditions of operation, there are obtained, after setting of the decomposition masses, products as hard as stone which can be readily ground and, after grinding, represent a satisfactorily storable and transportable fertilizer consisting of solid grains, and capable of being strewn, the softening point of which is considerably higher than the softening point of the known nitrophosphates of normal or increased water content.

The effects obtainable by the invention could in no way have been anticipated even by experts. If, for example, nitrophosphates, containing a normal or increased content of water of crystallization, are prepared by operating according to known processes and these nitrophosphates are carefully dehydrated, for example with warm dry air, to such an extent that the water content corresponds to that of the end products obtained according to the present invention, these products which have been subsequently converted into a form containing less water, are much more hygroscopic than the nitrophosphates obtained direct in a form containing only a little water by limiting the water content in the process of decomposition according to the invention.

It has further been found to be advantageous so to carry out the decomposition of the raw phosphates that the operation is first effected at lower temperature and the reaction only completed towards the end of the decomposition process by heating more strongly. In this way it is possible to carry out the decomposition in such a way that losses of acid by decomposition with the evolution of oxides of nitrogen are, to a large extent, avoided.

It is known that nitrophosphates on storing evolve small quantities of oxides of nitrogen. This disadvantage is overcome according to the invention by admixing, with the nitrophosphate poor in water prepared according to the invention after the conversion of the same into a size of grain suitable for fertilizing purposes, such small quantities of urea that the individual nitrophosphate grains are covered with a thin layer of powdery urea. Admixtures of less than 2% are, in general, suitable for the purpose.

According to German patent specification No. 339,567 raw phosphates are decomposed with nitric acid and urea is added to the decomposition product before setting in order to convert the readily deliquescent calcium nitrate into the double salt $$Ca(NO_3)_2.4CO(NH_2)_2$$

According to the present invention on the other hand, the finished nitrophosphate grains are only powdered on the surface with quite small quantities of urea in order to avoid the evolution of oxides of nitrogen.

A characteristic of the German Patent No. 339,567 is that a 60% nitric acid is recommended for the decomposition process. The necessity of converting the nitrophosphates so obtained by chemical reaction with urea into a storable product capable of being strewn, proves that the nitrophosphate directly obtained was not per se serviceable owing to its high water content.

The avoidance of the development of oxides of nitrogen during storage by simply applying very small quantities of urea is of technical and economical importance in that not only is the disturbing smell thereby avoided, but also the destruction of the packing materials, (sacks).

*Example*

1000 kgms. of morocco phosphorite, containing 33.68% of $P_2O_5$ and 50.67 of CaO were admixed in a kneading apparatus with 973.2 kgms. of a 72.56% nitric acid at temperatures of about 40° C. The mass was thereafter worked up for some time longer, whilst the temperature was increased to 60–70° C. The homogeneous decomposition product yielded after 8 days storage, a stone hard mass. By comminuting the same a nitrophosphate poor in water was obtained in the form of hard grains which were not softened by the heat of the hand. After a storage period of several months, the product still contained 94% of water-soluble phosphoric acid.

The superiority of the process of the invention is shown in the following comparative experiments which were all carried out with the same morocco phosphate (containing 8.6% of calcium carbonate) of the following composition:—

| | Percent |
|---|---|
| $SiO_2$ | 1.31 |
| CaO | 51.27 |
| MgO | 1.03 |
| $Fe_2O_3$ | 1.52 |
| $Al_2O_3$ | 0.13 |
| $SO_3$ | 1.47 |
| $CO_2$ | 3.78 |
| F | 2.73 |
| $H_2O$ at 110° C | 1.73 |
| $P_2O_5$ | 33.33 |

*Experiment 1 (according to the present invention)*

After analyzing the raw phosphate under treatment, the concentration and quantity of nitric acid to be employed was so calculated on a stochiometrical basis that 1 mol. of water was present in the end product for every mol. of $CaH_4(PO_4)_2$ and 2½ mols. of water for every mol. of $Ca(NO_3)_2$. As a result of this calculation of 1015 gms. of a 72.4% nitric acid were employed per 1000 gms. of raw phosphate. In order to compensate for losses, a further 2% of nitric acid was employed, i. e. a total of 1035 gms. The material converted after decomposition and setting into granular form showed the following properties:

Softening point:—42–44° C.

Capability of resisting damp air:—After taking up 4% of water the grains are still completely hard.

Behaviour on strewing:—The grains show no tendency to adhere to the hand and remain completely hard.

Experiment 2 (according to the present invention)

In order to produce a product, which contains only 2 mols. of water per 1 mol. of $Ca(NO_3)_2$ it was mathematically ascertained that for 100 gms. of phosphorite 962 gms. of a 76.5% nitric acid would be required. The amount employed was 980 gms.

Properties of the resulting granular material:—
Softening point:—50–52° C.
Capability of resisting damp air:—After taking up 4% of water the grains are still completely hard:
Behaviour on strewing:—The grains do not adhere to the surface of the hand, do not smear and remain completely hard.

Experiment 3 (according to known processes)

For 1000 gms. of raw phosphate, 1230 gms. of 60% nitric acid were employed. The decomposition in this case was rendered very difficult owing to strong foam formation. The decomposition product on setting formed a dry, somewhat porous solid mass.

Properties of the granular material:—
Softening point:—34–36° C.
Capability of resisting damp air:—After taking up 1% of water the grains are soft.
Behaviour on scattering:—The grains soften in a few minutes on the surface of the hand and betwen the fingers. They thereby smear and remain sticking to the hand.

Experiment 4 (according to known processes)

For 1000 gms. of raw phosphate 1187 gms. of 62% nitric acid were employed. After the decomposition product had cooled there remained a solid porous mass.

Properties of the granular material:—
Softening point:—35–37° C.
Capability of resisting damp air:—After taking up 0.5–0.8% of moisture the granular surfaces were smeary and sticky. After taking up 1.5–2% of moisture the grains were completely soft.

Behaviour on strewing:—The grains stick to the surface of the hand and partially melt.

Experiment 5 (according to known processes)

For 1000 gms. of raw phosphate, 1270 gms. of 55% nitric acid were employed so that theoretically only about 94% of the phosphoric acid could be converted into water-soluble form. On setting of the decomposition product only a semi-solid mass was formed which, under slight pressure, flowed apart; a product capable of strewing could not be obtained from this mass.

What we claim is:—

1. As a novel fertilizer a storable, transportable nitrophosphate capable of being strewn, the water of crystallization content of which is so low that for 1 mol. of calcium monophosphate, 1 mol. of $H_2O$ is present and for 1 mol. of calcium nitrate not more than 3 mols. are present.

2. As a novel fertilizer, a storable, transportable nitrophosphate capable of being strewn, the water of crystallization content of which is so low that per mol. of calcium monophosphate 1 mol. of $H_2O$ is present and per mol. of calcium nitrate not more than 3 mols. of $H_2O$ are present and the grains of which are covered with a thin layer of urea.

3. Process for the direct production of storable and transportable nitrophosphates capable of being strewn, therein characterized that raw phosphates are decomposed with nitric acid of a concentration between 65% and 75% with the precaution that the quantity of nitric acid employed is so selected that the decomposition product after setting contains not more than 3 mols. of water per mol. of calcium nitrate.

4. Process for the direct production of storable and transportable nitrophosphates capable of being strewn therein characterized that raw phosphates are decomposed with nitric acid, the concentration and quantity of which is so selected that in the end product 1 mol. of $H_2O$ is present per mol. of calcium monophosphate, the water present per mol. of calcium nitrate being between 2–3 mols. and the granular nitrophosphate obtained by comminuting the solidified decomposition product is protected against the evolution of oxides of nitrogen by the treatment on the surface with powdery urea.

EMIL LÜSCHER.
SAMUEL RUOSCH.